United States Patent [19]
Liu

[11] Patent Number: 5,955,676
[45] Date of Patent: Sep. 21, 1999

[54] CONNECTING ARM HAVING A CLAMPING END FOR USE IN BOURDON GAUGES

[75] Inventor: Paul Liu, Taipei, Taiwan

[73] Assignee: Jimray Marketing Inc., Taipei, Taiwan

[21] Appl. No.: 09/122,995

[22] Filed: Jul. 28, 1998

[51] Int. Cl.[6] .................................................... G01L 7/04
[52] U.S. Cl. ................................................................ 73/741
[58] Field of Search ............................. 73/732, 736, 737, 73/740, 741, 742, 743

[56] References Cited

U.S. PATENT DOCUMENTS

| | | | |
|---|---|---|---|
| 2,665,584 | 1/1954 | Bacon | 73/732 |
| 3,343,864 | 9/1967 | Baer | 73/731 |
| 4,240,298 | 12/1980 | Wetterhorn | 73/741 |
| 4,646,406 | 3/1987 | Weiss et al. | 73/741 |
| 5,481,921 | 1/1996 | Carpenter et al. | 73/742 |

*Primary Examiner*—William Oen
*Attorney, Agent, or Firm*—Bacon & Thomas, PLLC

[57] ABSTRACT

An improved connecting arm for use in a Bourdon gauge is secured between one end of a Bourdon tube and an indicating needle driving mechanism of the Bourdon gauge by welding. The connecting arm is provided with a clamping end which can be firmly engaged with a Bourdon tube and the other end engaged with the driving mechanism first manually so that Bourdon gauges so assembled then can be automatically processed by an automatic welding machine in a consecutive order without further manual interference, increasing the speed and safety of welding assembly in practical production of Bourdon gauges.

4 Claims, 9 Drawing Sheets

CONNECTING ARM HAVING A CLAMPING END FOR USE IN BOURDON GAUGES

BACKGROUND OF THE INVENTION

The present invention relates to an improved connecting arm for use in a Bourdon gauge which is secured between one end of a Bourdon tube and an indicating needle driving mechanism of the Bourdon gauge by welding. The connecting arm is provided with a clamping end which can be firmly engaged with a Bourdon tube and the other end engaged with the driving mechanism first manually so that Bourdon gauges so assembled then can be automatically processed by an automatic welding machine in a consecutive order without further manual interference, increasing the speed and safety of welding assembly in practical production of Bourdon gauges.

Bourdon tubes are a well known device having widely used in all kinds of Bourdon gauges for decades that are mainly mounted onto various vehicles, ships and airplanes for mechanically measuring and indicating oil or air pressures and temperatures of such transportation means. A Bourdon tube is coupled to an indicating needle driving mechanism of a Bourdon gauge at one end by way of a connecting arm fixed in place by welding. A Bourdon tube made of copper is hollow, semi-circular and flat in structure and is tightly sealed at one end and is in communication with a pressure source or a thermal source at the other end. The sealed end of the Bourdon tube is engaged with an indicating needle driving mechanism by a connecting arm which is commonly secured in place to the end of the Bourdon tube by welding so that variations in air or oil pressure and temperature in a Bourdon tube causing the Bourdon tube to be extended or withdrawn renders the indicating needle to point accordingly to a corresponding numeral on a gauge panel whereby a driver can have instant knowledge of the operating conditions of important parts of a vehicle, ship or an airplane.

Referring to FIGS. 1, 2, a first common Bourdon gauge is mainly made up of a tube mount 10, an indicating needle driving mechanism 20, a Bourdon tube 30 and a connecting arm 40. The needle driving mechanism 20 is secured to the tube mount 10 by screws and the Bourdon tube 30 is sealedly in communication with tube mount 10 at one end. The other end of the tube 30 is coupled to the connecting arm 40 by welding which is connected to the indicating needle driving mechanism 20 at the other end. The first conventional connecting arm 40 has a digit 7-shaped fixing end 43 and a horizontal extension 41 at one end. A through hole 42 is disposed on the horizontal extension 41 in correspondence to a rivet hole 24 on the indicating needle driving mechanism 20 so that the horizontal extension 41 of the connecting arm 40 can be riveted to the driving mechanism 20 first and then the fixing end 43 is manually secured to the Bourdon tube by welding in assembly.

Referring to FIGS. 3, 4, a second prior art Bourdon gauge is similarly comprised of a tube mount 10, an indicating needle driving mechanism 20, a semi-circular Bourdon tube 30 made of copper and a U-shaped connecting arm 40 made of a copper wire. The U-shaped wire connecting arm 40 having two separated ends to form an opening 44 is led through a through hole 24 on the needle driving mechanism 20. Then the opening 44 of the connecting arm 40 is welded in abutment against the end of the Bourdon tube 30.

The designs of connecting arms used in the prior art Bourdon gauges cited preceding have the following disadvantages in production process and practical use:

1. The first and second prior art connecting arms can only be placed in abutment against the end of a flat Bourdon tube without retaining support in an assembling process, so manual labor is indispensable to hold and put the parts assembled by welding, resulting in the low speed of production.
2. The manual welding process often results in poor quality in production and air leak problems as a result of uneven welding density and poor connection at joints, making the quality of production hard to control.
3. High temperatures in welding makes the manual production process dangerous and harmful to personnel in work as a result of negligence in operation.

SUMMARY OF THE INVENTION

Therefore, the primary object of the present invention is to provide an improved connecting arm for use in a Bourdon gauge so as to make automatic welding process become possible. The structure of the connecting arm is modified in such a manner that the connecting arm bridging a Bourdon tube and a needle driving mechanism is first in clamping engagement with the end of the semi-circular copper Bourdon tube manually and then an automatic welding process is used to make the connecting arm secured to each Bourdon gauge without manual interference, resulting in the increase of speed of production and the quality of Bourdon gauges and reduction of work accidents.

DETAILED DESCRIPTION OF THE PREFERRED EMBODIMENTS

Figure 1:
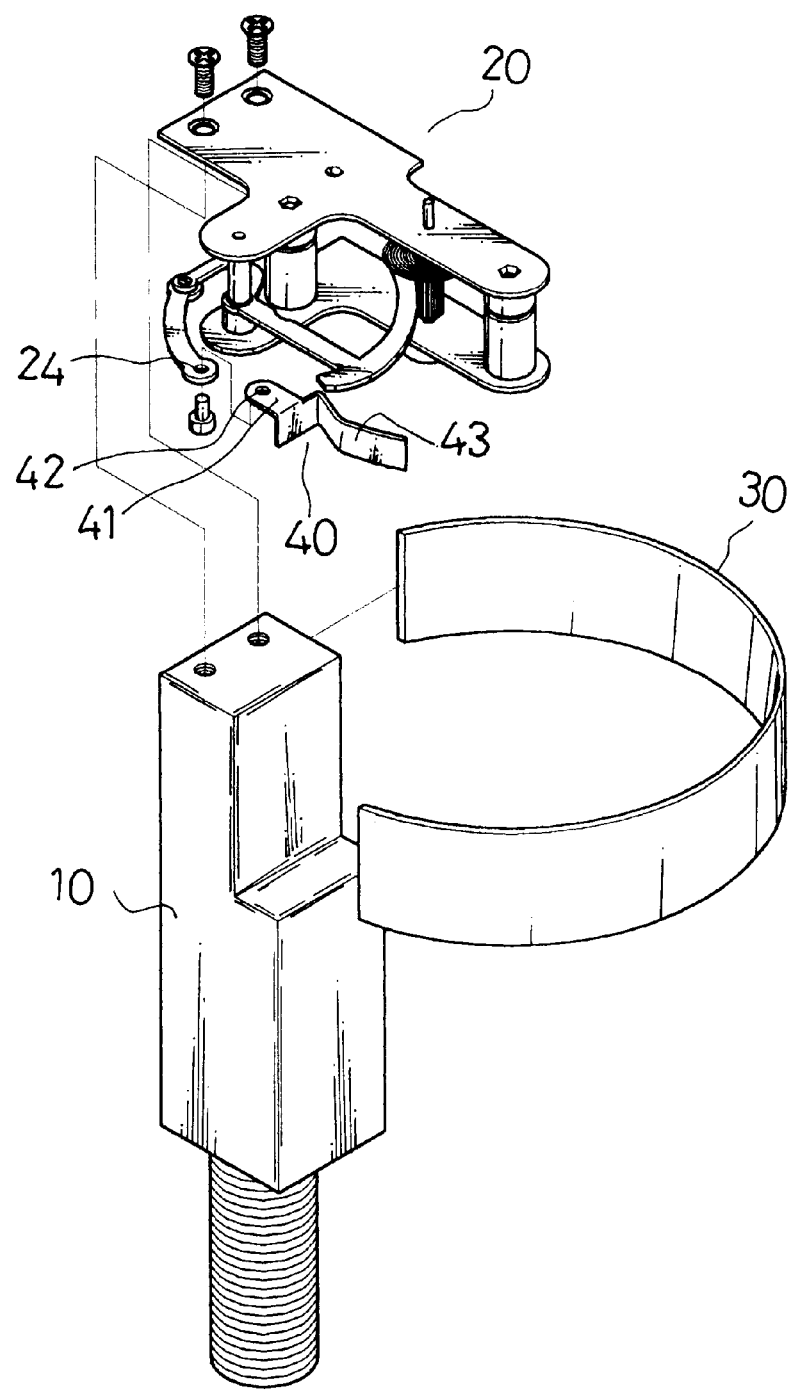
FIG. 1 is a diagram showing a first conventional connecting arm of a Bourdon gauge.
Figure 2:
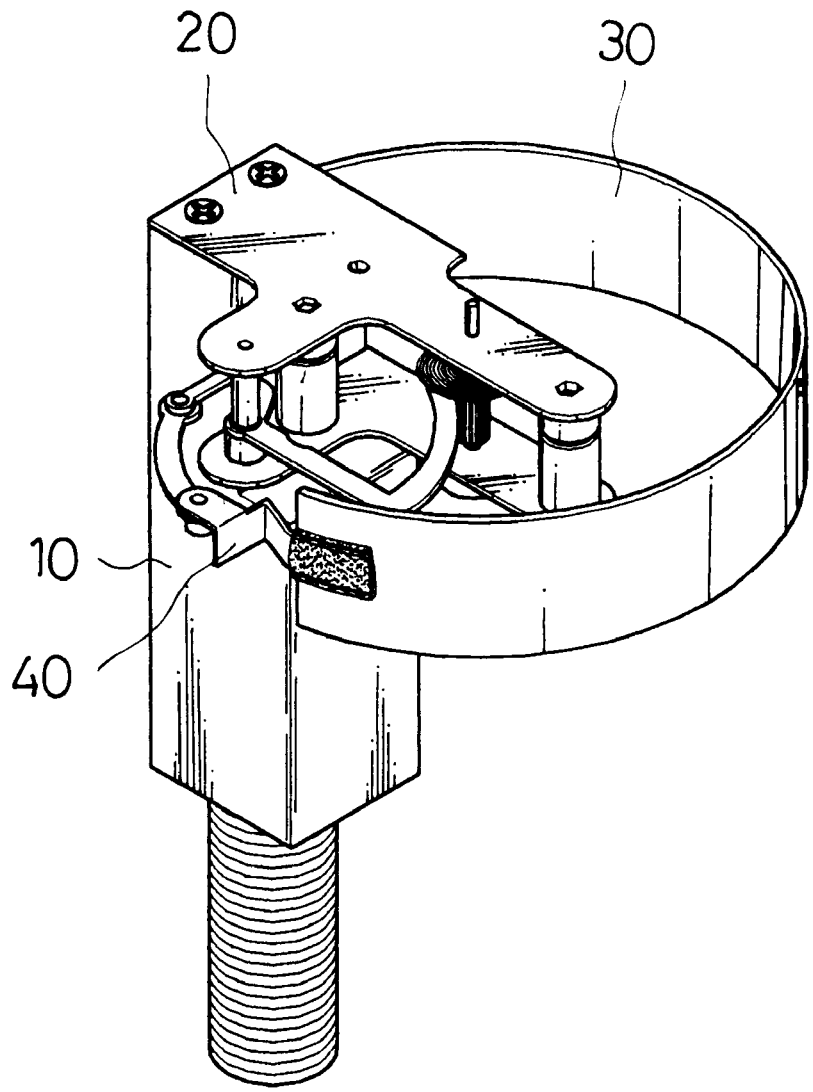
FIG. 2 is a second diagram showing the mounting of the connecting arm between a Bourdon tube and a needle driving mechanism.
Figure 3:
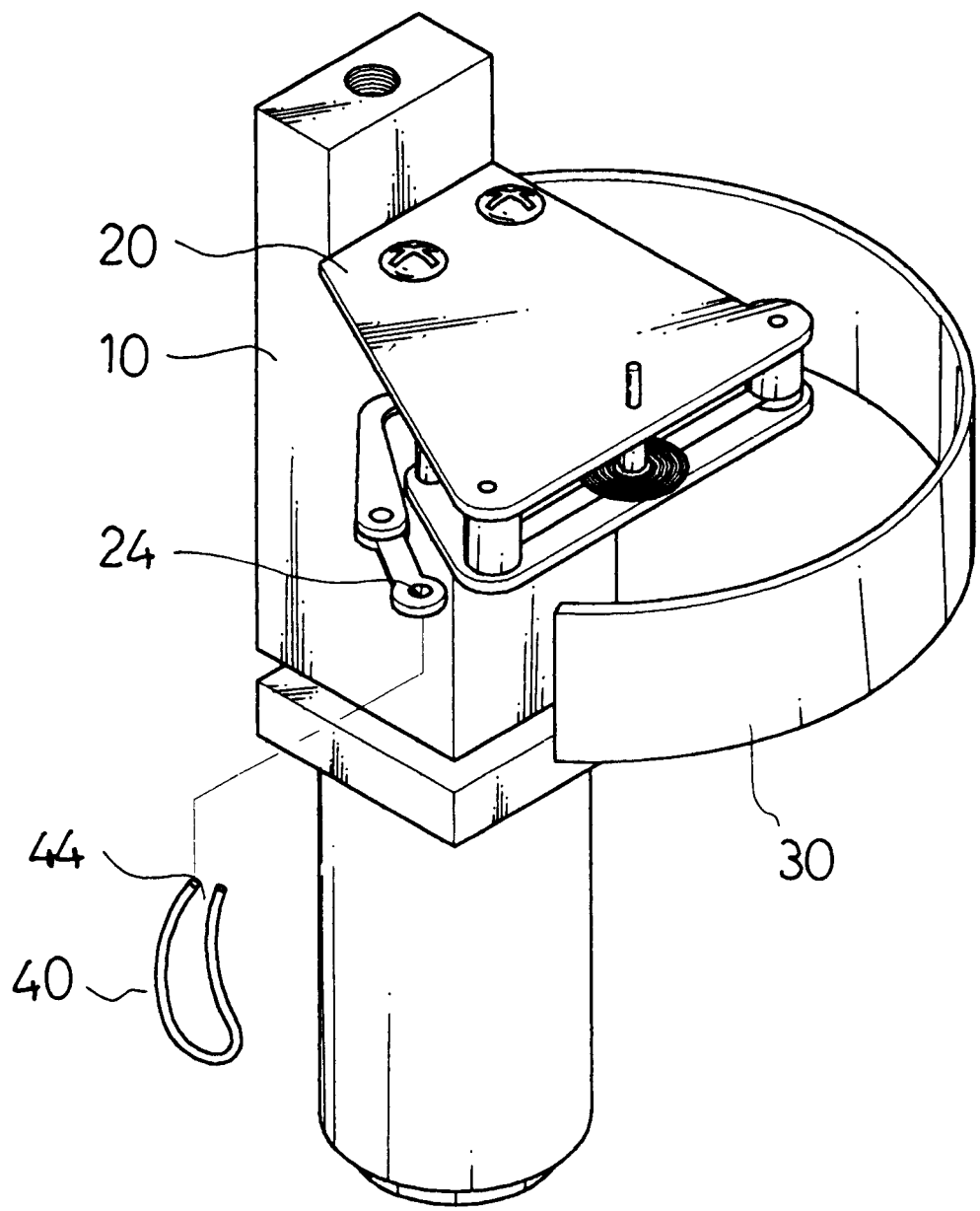
FIG. 3 is a diagram showing a second conventional connecting arm of a Bourdon gauge.
Figure 4:
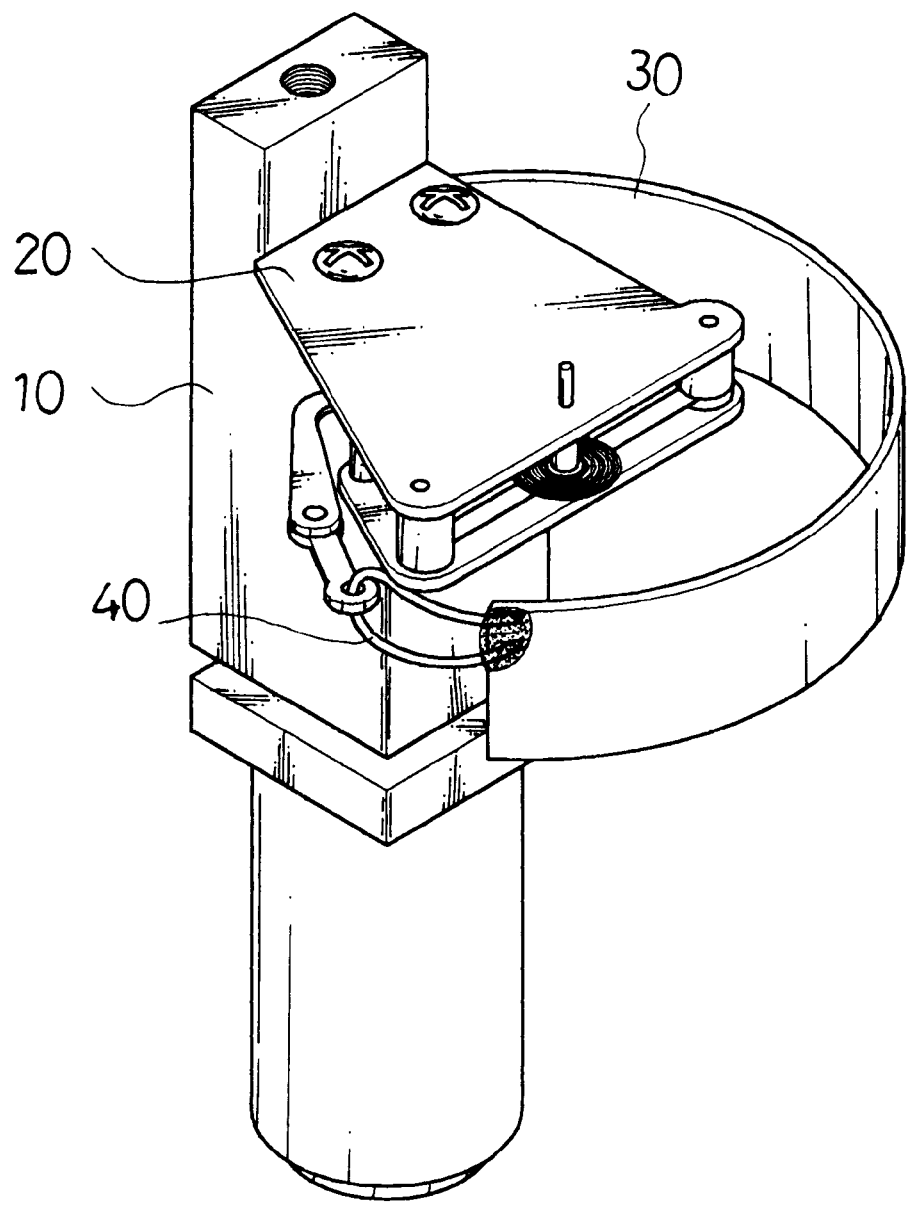
FIG. 4 is a diagram showing the mounting of the second connecting arm between a Bourdon tube and a needle driving mechanism.
Figures 5, 5A:
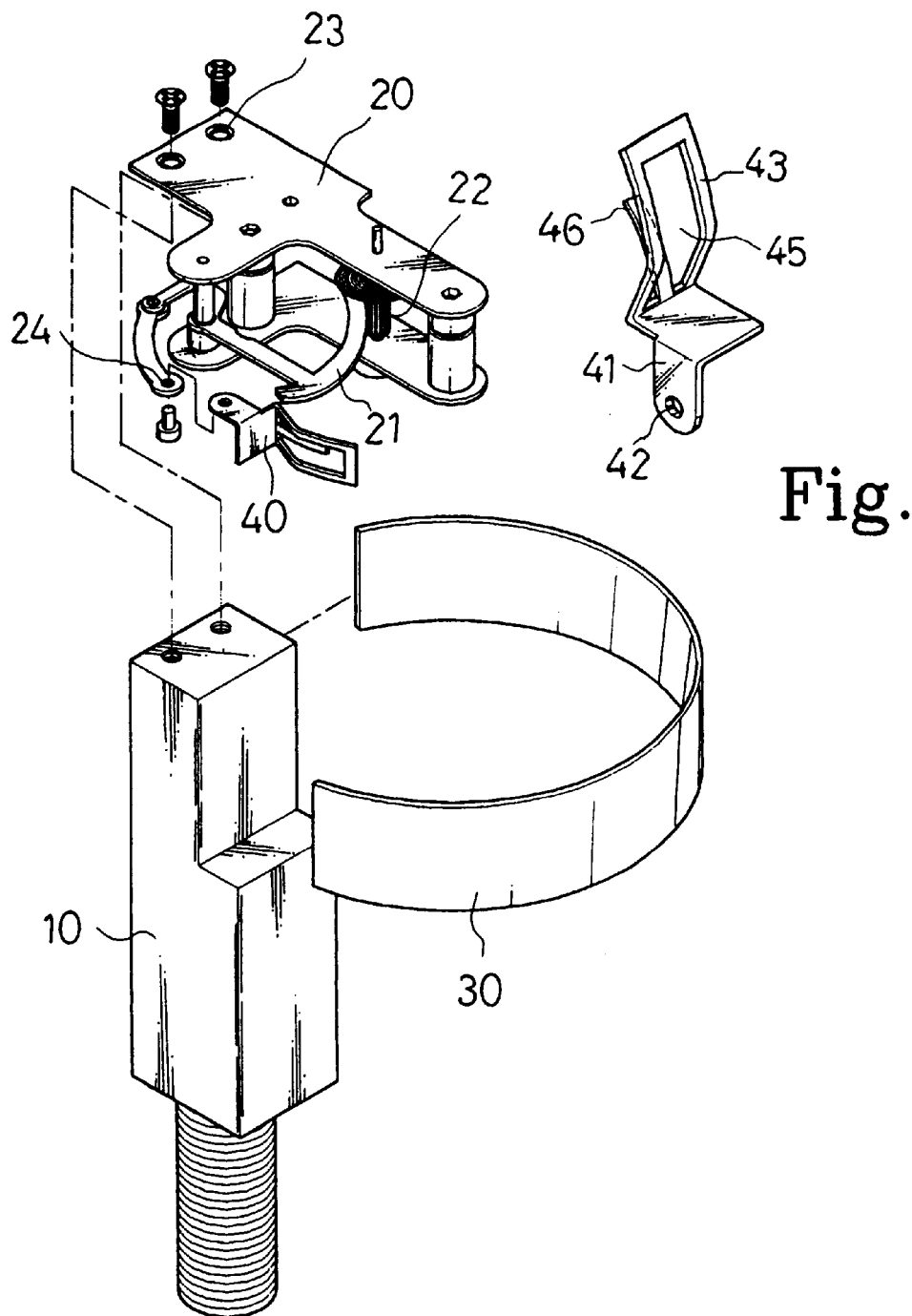
FIG. 5 is a diagram showing the exploded components including the improved connecting arm of the present invention.
FIG. 5A is an enlarged diagram showing the detailed structure of the connecting arm of the present invention.

Referring to FIG. 5, the first embodiment of the improved connecting arm 40 of the present invention is applied to a Bourdon gauge including a tube mount 10, an indicating needle driving mechanism 20 and a one-end sealed, flat and hollow Bourdon tube 30.

The needle driving mechanism 20 is mainly made up of a transmission gear means 21 and a needle driving gear 22 and has two screw holes 23 for fixing the driving mechanism 20 to the tube mount 10 by screws. A rivet hole 24 is defined at one end of the transmission gear means 21.

Figure 6:
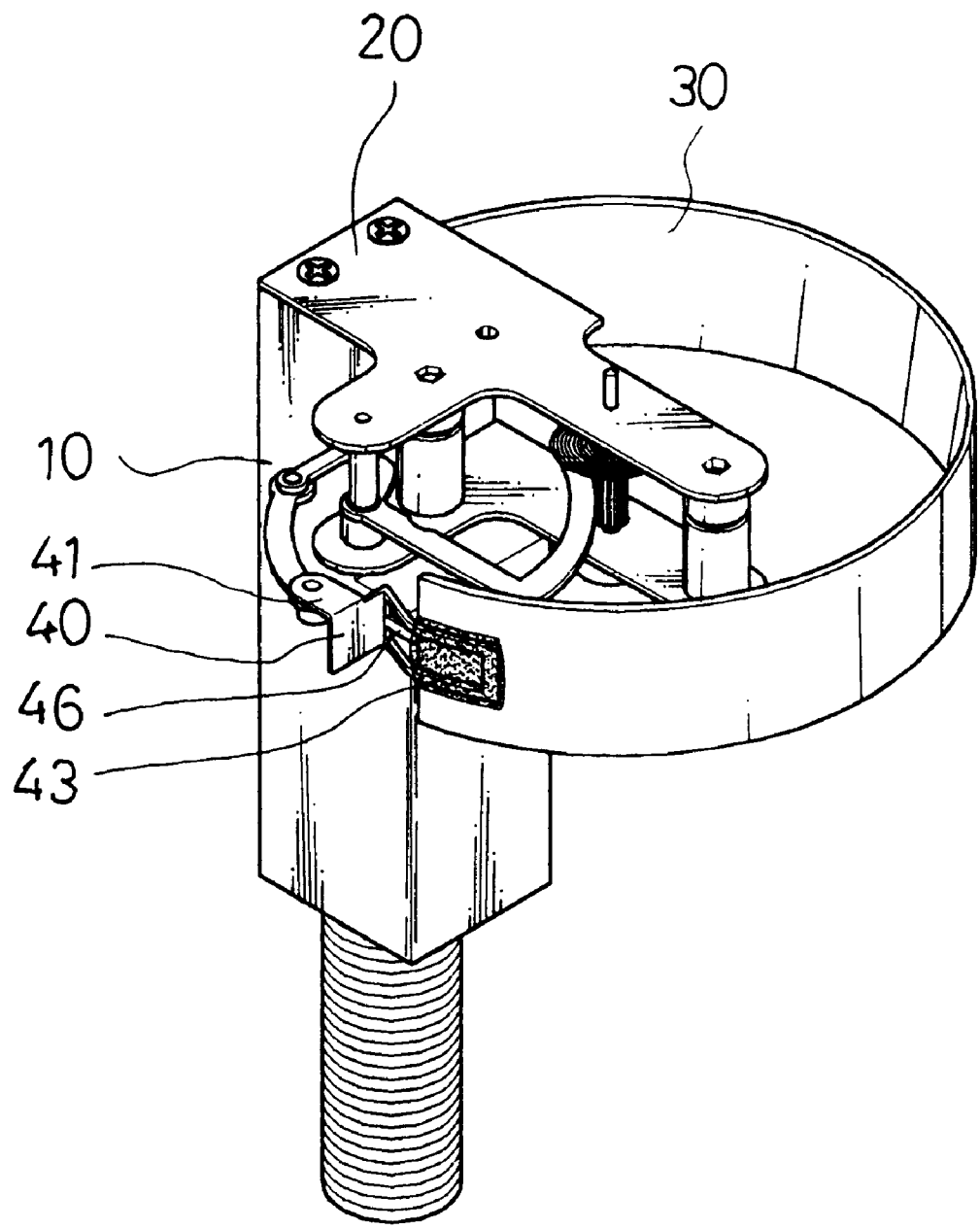
FIG. 6 shows the connecting arm of FIG. 5 being secured to the Bourdon tube by welding.

The connecting arm 40 is of a digit 7-like shape and has a curved clamping end 43 which is provided with a rectangular opening 45 and a clamping tongue 46 protruding from the rectangular opening 45. A horizontal lug 41 having a through hole 42 defined thereon in correspondence to the through hole 24 on the end of the transmission gear means 21 perpendicularly extends from the end of the connecting arm 40 so as to permit the connecting arm 40 to be riveted in engagement with the end of the transmission gear means 21 first, as shown in FIG. 6.

Then, before proceeding with a welding operation, manual labor is used to get the curved clamping end 43 of the connecting arm 40 in fixing engagement with the flat end of the Bourdon tube 30 with the help of the clamping tongue 46. Whereby a Bourdon gauge with a so assembled connecting arm 40 is delivered automatically into an automatic welding equipment to complete the welding assembly of a Bourdon gauge.

Figures 5B, 5C:
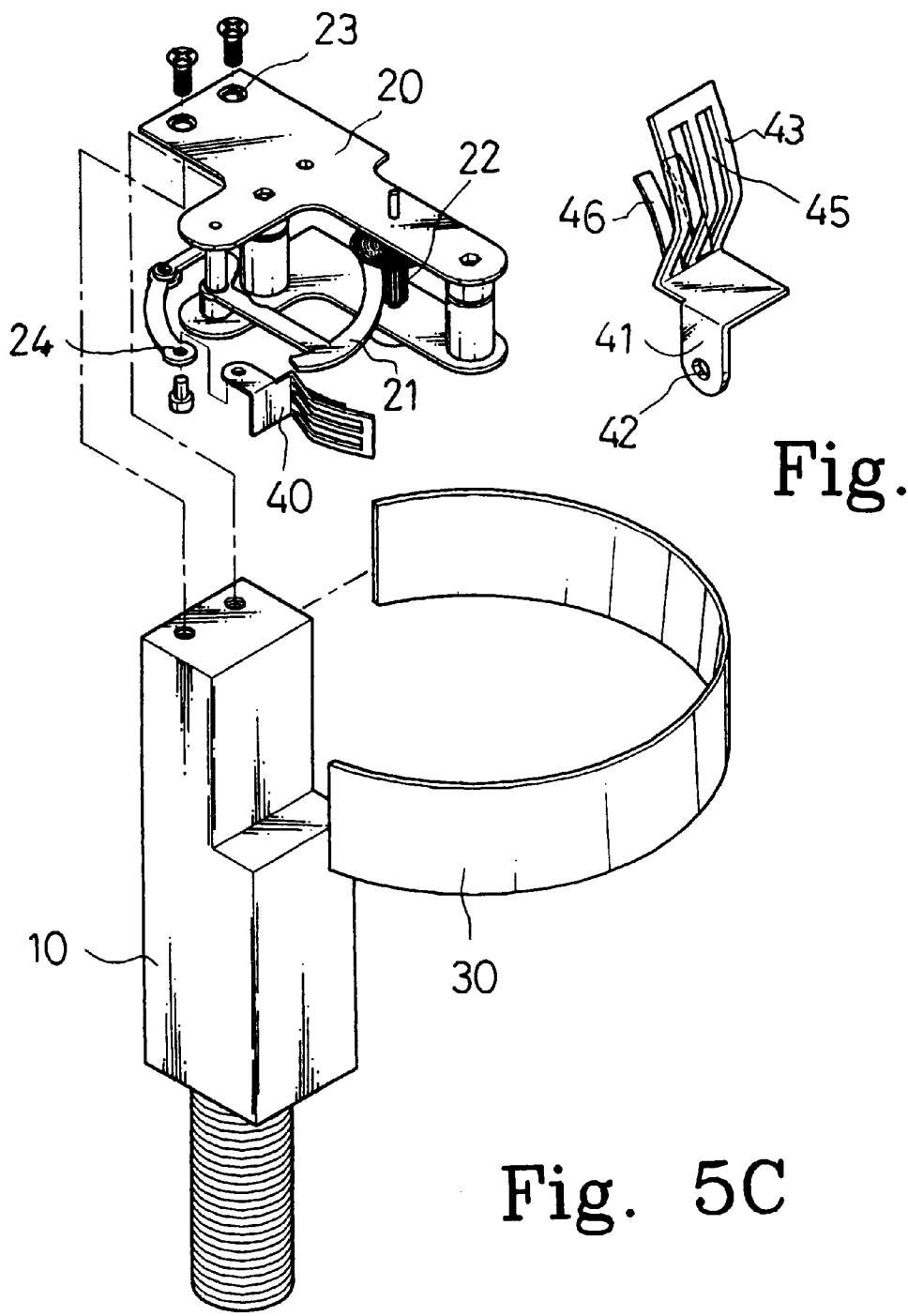
FIG. 5B is a diagram showing a connecting arm having a clamping end provided with more than one clamping tongue.

As further shown in FIG. 5B, the clamping tongue 46 of the clamping end 43 of the connecting arm 40 can be made more than one so as to make the clamping end to engage with the end of a Bourdon gauge in a firmer manner.

Figure 7:
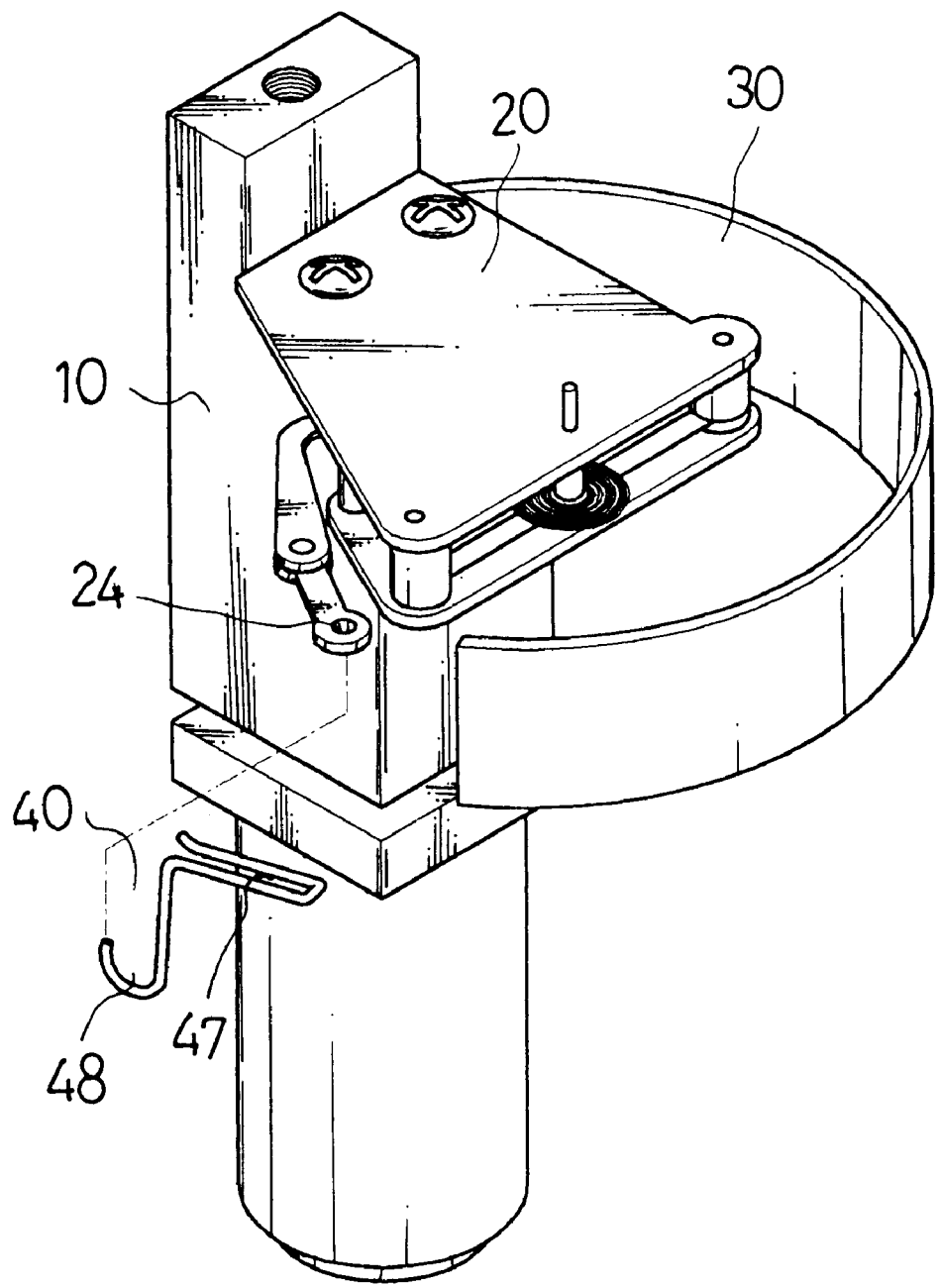
FIG. 7 is a diagram showing another connecting arm of the present invention.
Figure 8:
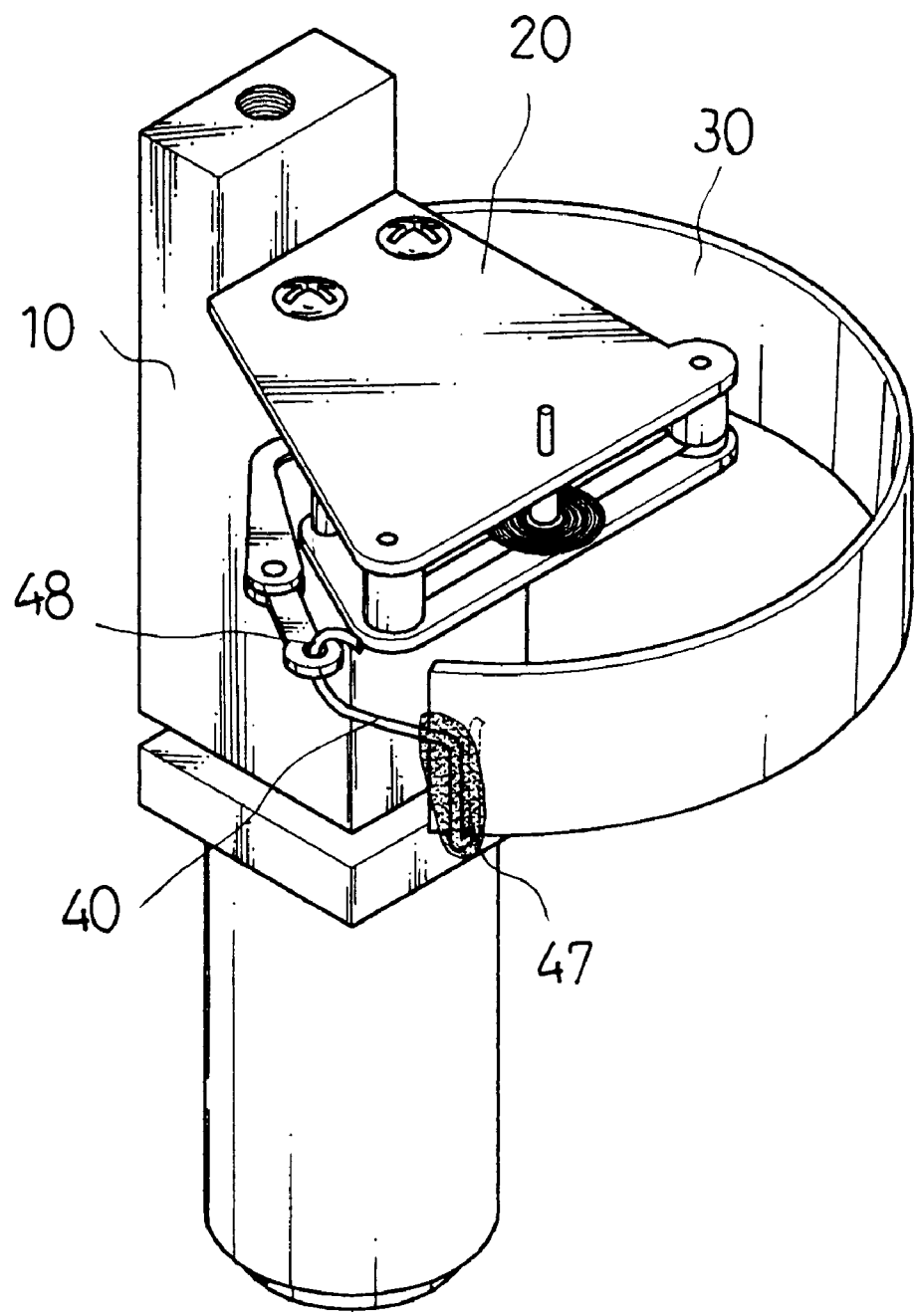
FIG. 8 shows the connecting arm of FIG. 7 being fixed to the Bourdon tube by welding.

Referring to FIGS. 7, 8, the second embodiment of the connecting arm 40 of the present invention is designed particularly for small-size Bourdon gauges. This connecting arm 40 is made of a copper wire bended into U-shaped clamping end 47 having a hook-like vertical extension 48 orthogonally projected therefrom, as shown in FIG. 7.

In assembly, the hook-like vertical extension is engaged with the hole 24 of the needle driving mechanism 20 and then the U-shaped clamped end 47 is clampedly secured to the flat end of the Bourdon tube so as to permit so assembled Bourdon gauge to undergo an automatic welding process without manual interference.

It can be clearly seen that the improved connecting arm of the present invention provided with a clamping end makes automatic production of Bourdon gauges possible whereby Bourdon gauges can be mass produced in a faster and safer manner.

I claim:

1. An improved connecting arm for use in to a Bourdon gauge including a tube mount, an indicating needle driving mechanism and a one-end sealed, flat and hollow Bourdon tube; said needle driving mechanism being mainly made up of a transmission gear means and a needle driving gear engaged with said transmission gear means and has two screw holes for fixing the driving mechanism to the tube mount by screws; a rivet hole being defined at one end of the transmission gear means;

wherein said connecting arm has one end engaged with said transmission gear means and one clamping end in clamping engagement with the sealed end of said flat hollow Bourdon tube whereby said connecting arm bridging said transmission gear means and said Bourdon tube of said Bourdon gauge can be retained in place without manual holding so as to permit said connecting arm to be welded in place by an automatic welding equipment.

2. The connecting arm for use in a Bourdon gauge wherein said connecting arm has a digit 7-like shape; and said clamping end is provided with a rectangular opening and a clamping tongue protruding from said rectangular opening; a horizontal lug has a through hole defined thereon in correspondence to said through hole on the end of the transmission gear means perpendicularly extends from the end of the connecting arm so as to permit the connecting arm to be riveted in engagement with said transmission gear means at one end and to be clamped to said Bourdon gauge at the other end before going through an automatic welding process.

3. The connecting arm as claimed in claim 2 wherein said protruded clamping tongue can be made more than one so as to permit said clamping end of said connecting arm to be retained in place in a firmer manner.

4. The connecting arm as claimed in claim 1 wherein said connecting arm is made of a copper wire bended into U-shaped clamping end having a hook-like vertical extension orthogonally projected therefrom whereby said hook-like vertical extension is engaged with said hole of said needle driving mechanism and then said U-shaped clamped end is clampedly secured to the flat end of the Bourdon tube, permitting so assembled Bourdon gauge to undergo an automatic welding process without manual interference.

* * * * *